United States Patent
Carraro et al.

(10) Patent No.: US 6,323,861 B1
(45) Date of Patent: *Nov. 27, 2001

(54) DISPLAY TECHNIQUES FOR THREE DIMENSIONAL VIRTUAL REALITY

(75) Inventors: Gianpaolo U. Carraro; James Robert Ensor, both of Red Bank, NJ (US)

(73) Assignee: Lucent Technologies Inc., Murray Hill, NJ (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/906,215

(22) Filed: Aug. 4, 1997

(51) Int. Cl.[7] ............................ G06T 17/00; G06T 15/70; G09G 15/00
(52) U.S. Cl. ........................ 345/428; 345/420; 345/619; 345/630; 345/473
(58) Field of Search ...................................... 345/115, 118, 345/420, 428, 435, 132, 334, 619, 630

(56) References Cited

U.S. PATENT DOCUMENTS 5,261,041 * 11/1993 Susman ............................. 345/473

* cited by examiner

Primary Examiner—Mark Zimmerman
Assistant Examiner—Philip H Stevenson
(74) Attorney, Agent, or Firm—Eugene J. Rosenthal

(57) ABSTRACT

A limitation of a three-dimensional world in which objects in the distance may be represented in only two dimensions as a video on a screen occurs when a computer graphic object represented by computer graphics, e.g., in front of, to the side, above, or below the video screen, undergoes a trajectory that takes it to a location in the world that is not represented as computer graphics, but instead is within the field represented by the video, because such an object would disappear from view by the viewer. This limitation is overcome by having such an object be represented as video on the screen, rather than computer graphics. Thus, the computer graphics object "goes into the video" as video and remains visible to a viewer in front of the video screen, rather than becoming invisible because it is blocked from view by the video screen if it were to be generated at its proper location using computer graphic techniques.

20 Claims, 3 Drawing Sheets

(2 of 3 Drawing Sheet(s) Filed in Color)

DISPLAY TECHNIQUES FOR THREE DIMENSIONAL VIRTUAL REALITY

TECHNICAL FIELD

This invention relates to the integration of computer graphics and video to provide a realistic three dimensional virtual reality experience.

BACKGROUND OF THE INVENTION

The display of a three dimensional world to a viewer requires considerable computation power, and it is typically costly to develop the necessary highly detailed models required for doing so. In order to simplify the problem, a portion of the world that is in the distance may be represented in only two dimensions as a video displayed on a surface, e.g., a screen. By video it is meant the common usage of the term, such as the placing or projecting of predefined images on the surface, e.g., the electronic version of filmed moving pictures. Thus, such a world is essentially truncated in length to the screen on which the video is displayed. A great reduction in computation power and cost can be achieved by such an arrangement.

SUMMARY OF THE INVENTION

A limitation of such a world occurs when a computer graphic object represented by computer graphics, e.g., in front of, to the side of, above, or below the video screen, undergoes a trajectory that takes it to a location in the world that is not represented as computer graphics, but instead is within the field represented by the video. We have recognized that, in accordance with the principles of the invention, when a computer graphic object undergoes a trajectory that takes it to a location in the world that is not represented as computer graphics, but instead is within the field represented by the video, such an object should be represented as video on the screen, rather than computer graphics. Thus, the computer graphics object "goes into the video" as video and remains visible to a viewer in front of the video screen, rather than becoming invisible because it is blocked from view by the video screen if it were to be generated at its proper location using computer graphic techniques.

BRIEF DESCRIPTION OF THE DRAWING

The file of this patent contains at least one drawing executed in color. Copies of this patent with color drawing(s) will be provided by the Patent and Trademark Office upon request and payment of the necessary fee.

In the drawing.

DETAILED DESCRIPTION

To better understand the invention, FIGS. 1–4 show an example of that which a user sees according to the invention when a computer graphic object undergoes a trajectory that takes it to a location in the world that is not represented as computer graphics, but instead is within the field represented by the video, such an object should be represented as video on the screen, rather than computer graphics. In other words, FIGS. 1–4 show an example of a computer graphics object "going into the video" as video and remaining visible to a viewer in front of the video screen, rather than becoming invisible because it is blocked from view by the video screen if it were to be generated at its proper location using computer graphic techniques.

Figure 1:
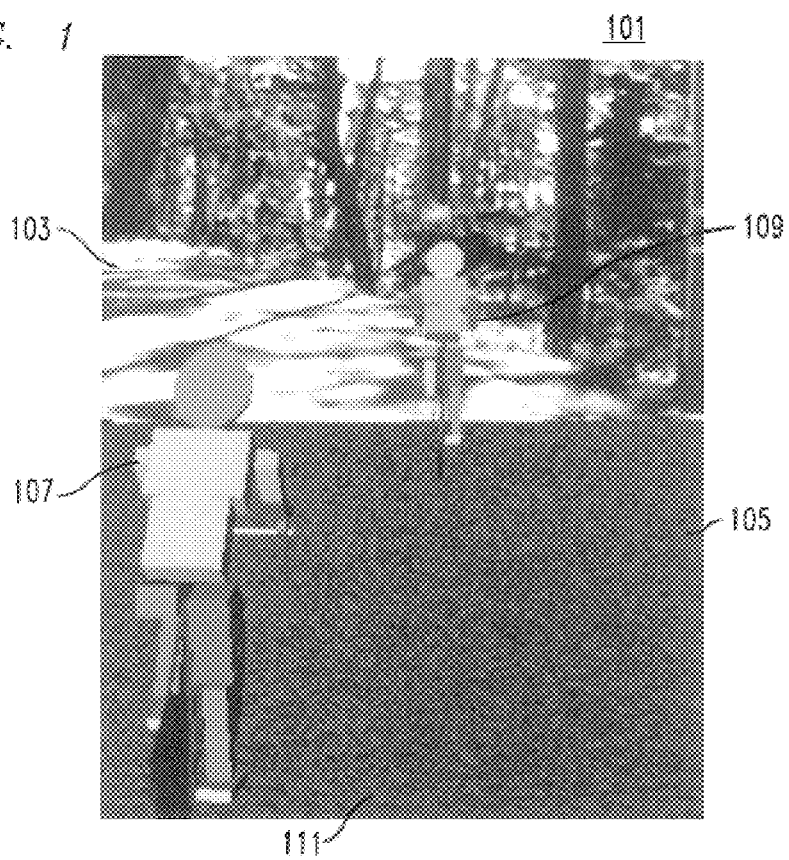
FIGS. 1–4 show an example of that which a user sees according to the invention when a computer graphic object undergoes a trajectory that takes it to a location in the world that is not represented as computer graphics, but instead is within the field represented by the video, such an object should be represented as video on the screen, rather than computer graphics.
Figure 2:
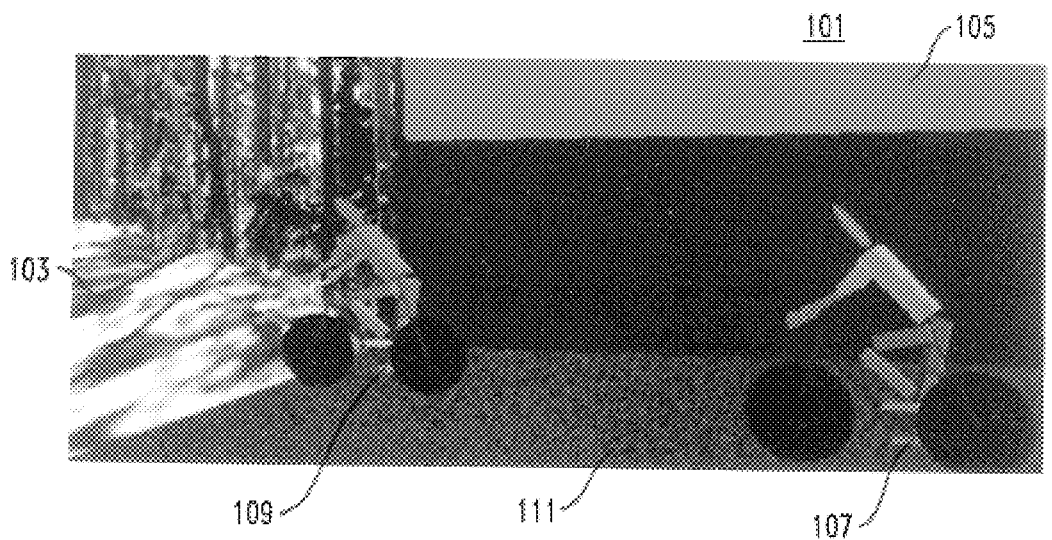
Figure 3:
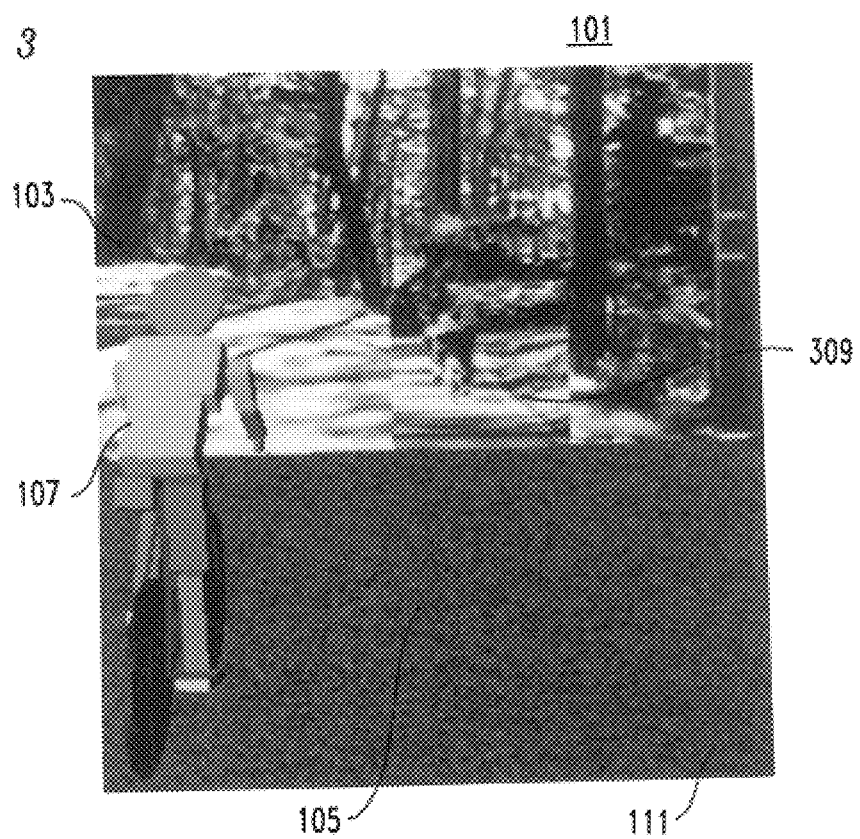

FIG. 1 shows world 101, which is a bicycle path in a park, e.g., Central Park in New York City. World 101 is divided into two portions, video screen 103, on which is shown the current frame of a video and the remainder of the world 105, which is represented using computer graphics techniques, and is thus referred to herein as computer graphics part (CG Part) 105. Within CG Part 105 there are various elements, such as bicyclist 107 representing the user, another bicyclist 109, and road 111.

Figure 4:
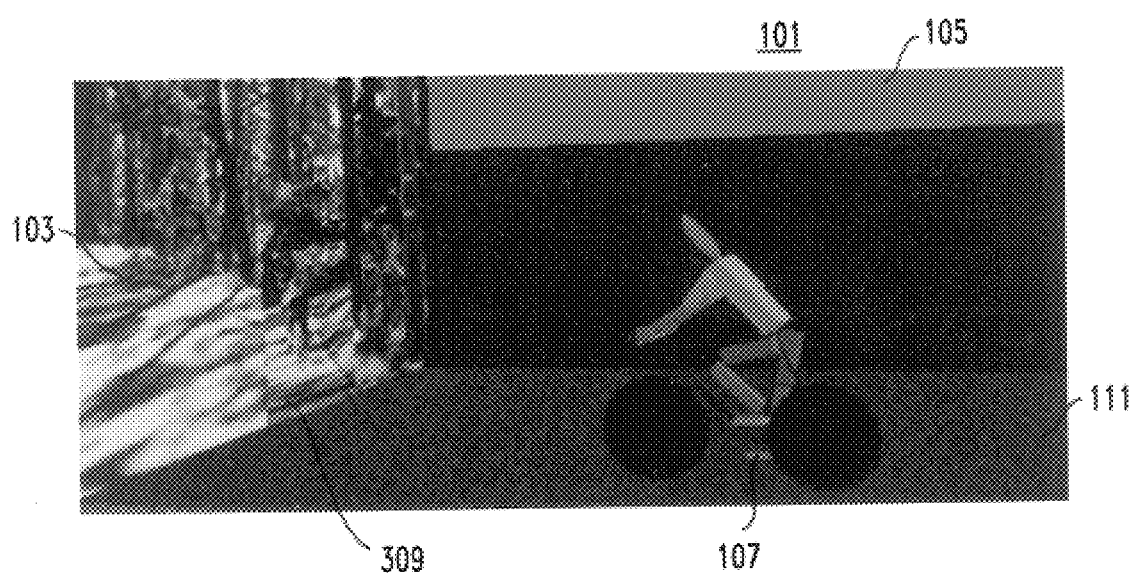

Note that the viewpoint of the user is actually behind the representation of both bicyclists 107 and 109. Also note that bicyclist 107, is moving slower than bicyclist 109. If this continues, eventually, bicyclist 109 will reach screen 103 while bicyclist 107 lags behind. This occurs in FIG. 2, which shows world 101 of FIG. 1, but at a later time and from a side perspective. If the relative motion difference continues between bicyclists 107 and 109, part, and then all, of bicyclist 109 will intersect with, or go past, video screen 103. If this happens, part, and then all, of bicyclist 109 will become occluded by video screen 103 from a user in front of video screen 103, and so it will no longer be visible to such a user. Therefore, in accordance with the principles of the invention, bicyclist 109 is represented as video 309 that is merged into the video being displayed on video screen 103 rather than being represented using computer graphic techniques as 109 within CG Part 105, as shown in 3. A corresponding side view is shown in FIG. 4.

The determination to represent an object, such as bicyclist 109, as video, such as video 309, that is merged into the video being displayed on the video screen rather than being represented using computer graphic techniques within CG Part 105, may be made when the object is within a predetermined distance from the video screen rather than requiring the change in representation to be at the exact point when the object intersects the video screen. Furthermore, the distance employed may be determined dynamically, e.g., as a function of the speed and trajectory of the bicyclist. The merging in may also take place only once it is determined that a predetermined portion of the object has actually intersected, or passed through, the video screen.

In other implementations of the invention, computer graphics representation 109 may remain visible from other viewpoints, such as overhead. Thus, in accordance with an aspect of the invention, the determination as to whether or not to merge an object that is being represented using computer graphic techniques into the video being displayed on the video screen rather than continuing to be represented by using computer graphic techniques may be additionally a function of the viewpoint of the user. Preferably, but not necessarily, no viewpoint should have both video 309 and computer graphics 109 visible at the same time.

In the event that bicyclist 107 speeds up or bicyclist 109 slows down, so that based on the relative motion between them bicyclist 109 would no longer be at or beyond video screen 103, bicycle 109 may again be rendered using computer graphics techniques, as shown in FIG. 1.

Figure 5:
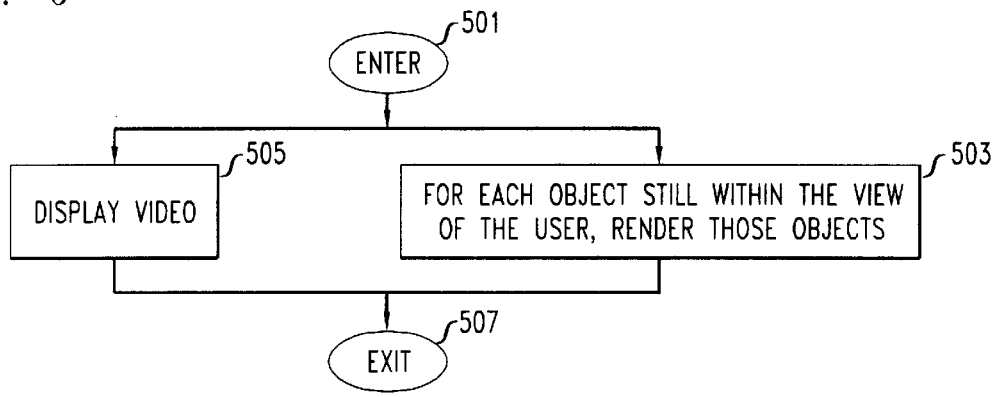
FIG. 5 shows an exemplary process for displaying the world to a user, in accordance with the principles of the invention.

FIG. 5 shows an exemplary process for displaying the world to a user, in accordance with the principles of the invention. The process is entered in step 501 whenever the world view of the user needs to be updated. It may be necessary to update the world view of the user a) whenever a new frame of video must be displayed; b) when an object within computer graphics part of the world, e.g., CG Part 105, has moved; c) when the user's viewpoint is changed; or d) for any combination of the foregoing reasons. Thereafter, steps 503 and 505 are performed, and these steps may be performed in parallel. In step 503, each object that is still within the view of the user and has not been merged into the video is rendered within the computer graphics part of the world. In step 505 a frame of video is displayed on video screen. This may be either a new frame of video, if it is time to update the video frame being displayed, or it may be the same frame of video that was previously displayed, if the world view of the user is being updated because of a need to change the representation of the computer graphics part of the world. Note that the frame of video that is displayed may be a "composed" frame of video in that includes a background video and video representing at least one object that was formerly represented the computer graphics portion of the world using computer graphics techniques. The process then exits in step 507.

Figure 6:
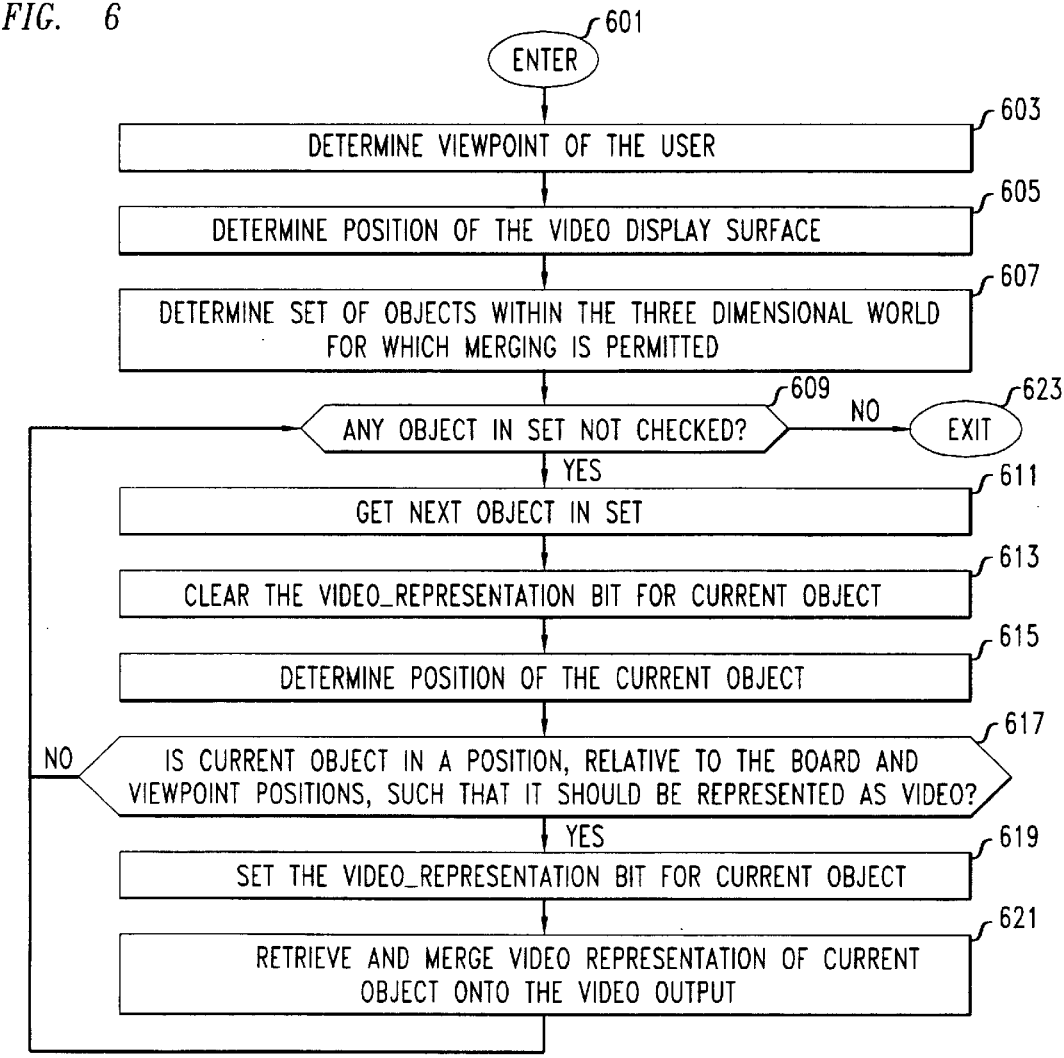
FIG. 6 shows an exemplary process, in accordance with the principles of the invention, for composing a frame of video for display on a video screen.

FIG. 6 shows an exemplary process, in accordance with the principles of the invention, for composing a frame of video that is displayed in step 505 (FIG. 5). The process is entered in step 601 whenever it is determined that a new frame of video is required for display. Thus, execution of the process of FIG. 6 may be linked to step 505 or it may be independent thereof. Next, in step 603, the viewpoint of the user is determined. Thereafter, in step 605, the position of the video display surface, e.g., screen, is determined, and then, in step 607, the set of objects within the three dimensional world for which merging is permitted is determined. Such objects may be identified by a set flag, such as a VIDEO_PERMITTED flag, within their data structure.

Conditional branch point 609 tests to determine if there remain any objects in the set of objects for which merging is permitted that have not yet been checked to determine if they should be displayed as video or using computer graphic techniques. If the test result in step 609 is NO, indicating that all the objects for which merging is permitted have been checked to determine if they should be displayed as video or using computer graphic techniques, control passes to step 623 and the process is exited. If the test result in step 609 is YES, indicating that all the objects for which merging is permitted have not been checked to determine if they should be displayed as video or using computer graphic techniques, control passes to step 611, in which the next object from the set that has not yet been checked is retrieved, and the retrieved object is made the current object.

Next, in step 613, a flag, e.g., a bit called VIDEO_REPRESENTATION, for the current object is cleared. In step 615, the position of the current object is determined. Optionally, the motion of the current object, e.g., its speed and trajectory, are also determined.

Thereafter, in accordance with the principles of the invention, conditional branch point 617 tests to determine if the current object should be represented by video. As noted above, if the object is at a point in its trajectory that takes it to a location in the world that is not represented as computer graphics, but instead is within the field represented by the video, the object should be represented as video, rather than using computer graphics. More specifically, such a determination may be based, in accordance with an aspect of the invention, on the distance of the object from the video screen. This distance may be determined dynamically, e.g., as a function of the speed and trajectory of the bicyclist. The determination to represent an object as video may be made only if a predetermined portion of the object has actually intersected, or passed through, the video screen.

If the test result in step 617 is NO, indicating that the object may be displayed using computer graphics, control passes back to step 609 and the process continues as described above. If the test result in step 617 is YES, indicating that the computer graphics object must go into the video as video, control passes to step 619 in which the VIDEO_REPRESENTATION bit for the current object is set. This indicates that the object is being represented as video and so should not be displayed in the computer graphics part of the world. Thereafter, in step 621, a video representation of the current object is retrieved and merged with the already composed video frame. This may be achieved by using a replacement technique to replace that part of the already composed video frame by retrieved video representation. Alternatively, a merging technique may be employed. Control then passes back to step 609 and the process continues as described above.

The development of the merged video of step 621 may be achieved using an alternative method. Instead of developing a single frame of video for display, multiple, stacked video screens may be employed, with one screen displaying the frame that would be displayed if no objects were merged into the video and each of the other screens displaying the video representation of each object that is currently merged into the video. The viewer in front of all the screens would see a composite image containing all the video elements and appearing as a single screen. In such a case, step 505 (FIG. 5) would encompass displaying the videos of all of the screens.

Note that the video screen may be any surface and need not be simply a planar surface.

The foregoing merely illustrates the principles of the inventions. It will thus be appreciated that those skilled in the art will be able to devise various arrangements which, although not explicitly described or shown herein, embody the principles of the invention and are included within its spirit and scope.

What is claimed is:

1. A method for use in processing a view of a three dimensional world in which a first portion of said world is modeled as computer graphics and a second portion of said world is represented by a video display on a video screen which exists in said first portion of said world, wherein said video is made up of a sequence of images, the method comprising the steps of:

determining that an object, other than said video screen, is being modeled as computer graphics and has moved to a location (i) that is being represented by said video and (ii) at which said object is at least partly occluded from view of a viewer of said world by said video screen although said object should not appear occluded to said viewer when at said location;

changing the representation of said object from one modeled as computer graphics to a video representation thereof; and displaying said video representation so that it appears to said viewer to be substantially integrated with said video on said video screen.

2. A method for use in processing a view of a three dimensional world in which a first portion of said world is modeled as computer graphics and a second portion of said world is represented by a video displayed on a video surface which exists as a first object in said computer graphics portion of said world, comprising the step of:

merging the representation of a second object that had been modeled as computer graphics with that of said video surface, so that said second object is represented as part of said video displayed on said video surface as a function of a distance between said object and said video surface independent of a distance between a viewer and said object.

3. The invention as defined in claim 2 wherein said changing of representation in said changing step is a further function of a speed of said object.

4. The invention as defined in claim 2 wherein changing of representation in said changing step is a further function of a trajectory of said object.

5. The invention as defined in claim 2 wherein changing of representation in said changing step is a further function of a viewpoint of a viewer of said three dimensional world.

6. A method for use in processing a view of a world in which a first portion of said world is modeled as computer graphics and a second portion of said world is represented by a video on a video surface which exists in said computer graphics portion of said world, said video initially depicting at least a first object of said world, wherein said video is made up of a sequence of images, the method comprising the step of:

changing the representation of a second object that is initially represented as computer graphics from a computer graphics representation to a video representation when said object undergoes a trajectory that takes at least a portion of said object to (i) a location in the world that is not represented as computer graphics but instead is being represented by said video on said video surface and (ii) at which said second object is at least partly occluded from view of a viewer of said world by said video surface although said second object should not appear occluded to said viewer when at said location; and displaying said world so that it appears to said viewer that said video representation of said second object is substantially integrated with said video on said video surface.

7. The invention as defined in 6 wherein said changing step is a function of a viewpoint of a viewer.

8. The invention as defined in 6 wherein said changing step is a function a speed of said object.

9. A method for use in processing a view of a world in which a first portion of said world is modeled as computer graphics and a second portion of said world is represented by a video on a video surface which exists as an object in said first portion of said world, wherein said video is made up of a sequence of images, the method comprising the steps of:

displaying a second object using only a video representation of said second object displayed on said video surface when at least a portion of said second object is determined to be at a location in the world that is not represented as computer graphics but instead is within the field represented by said video on the video surface; and displaying said second object as a computer graphics object in said first portion of said world in addition to and independent from said video surface when said second object is determined to be at a location in the world that is represented as computer graphics.

10. The invention as defined in claim 9 wherein said video representation of said object is displayed on said video surface.

11. The invention as defined in claim 9 further including the step of changing a representation of said object from computer graphics to video when said portion of said object transits from a location in the world that is represented as computer graphics to a location within the field represented on the video surface.

12. The invention as defined in claim 9 further including the step of changing a representation of said object from video to computer graphics when said portion of said object transits from a location in the world represented on the video surface to a location within the field that is represented as computer graphics.

13. A system for displaying an apparently three dimensional world to a user, in which a first part of said three dimensional world is displayed as computer graphics and a second part is displayed as video on a video screen, wherein said video is made up of a sequence of images, said system comprising:

a processor for determining that an element displayed in said first part of said world transited from said first part to said second part by having moved to a location (i) that is being represented by said second part and (ii) at which said element is at least partly occluded from view of a viewer of said world by a said video screen although said object should not appear occluded to said viewer when at said location; and a rendering engine for displaying said world with said element displayed so that it appears to said viewer to be substantially integrated into said second part rather than said first part.

14. A system for displaying an apparently three dimensional world to a user, in which a first part of said three dimensional world is displayed as computer graphics and a second part is displayed as video on a video screen, wherein said video is made up of a sequence of images, said system comprising:

a processor for determining that a portion of an object initially in said first part of said world has moved to a location within said second part by virtue of having moved to a location (i) that is being represented by said second part and (ii) at which portion of said object is at least partly occluded from view of a viewer of said world by a said video screen although said object should not appear occluded to said viewer when at said location; and a rendering engine for displaying said world with said element displayed so that it appears to said viewer to be substantially integrated into said second part rather than said first part.

15. Apparatus for use in processing a view of a three dimensional world in which a first portion of said world is modeled as computer graphics and a second portion of said world is represented by a video, wherein said video is made up of a sequence of images, the apparatus comprising:

means for determining that an object being modeled as computer graphics has moved to a location that is being represented by said video by having moved to a location (i) that is being represented by said second part and (ii) at which said element is at least partly occluded from view of a viewer of said world by a said video screen although said object should not appear occluded to said viewer when at said location; and means for changing the representation of said object from one modeled as computer graphics to a video representation thereof displayed so that it appears to said viewer to be substantially integrated into said second part rather than said first part.

16. The invention as defined in claim 15 further comprising means for displaying said video representation of said object merged with said portion of said world that is represented by said video.

17. Apparatus for use in processing a view of a world in which a first portion of said world is modeled as computer graphics and a second portion of said world is represented by a video on a video surface which exists as an object in said first portion of said world, wherein said video is made up of a sequence of images, said apparatus comprising:

means for displaying a second object using a video representation of said second object displayed on said video surface when at least a portion of said second object is determined to be at a location in the world that is not represented as computer graphics but instead is within the field represented by said video on the video surface; and means for displaying said second object as a computer graphics object in said first portion of said world in addition to and independent from said video surface when said second object is determined to be at a location in the world that is represented as computer graphics.

18. The invention as defined in claim 17 wherein both of said means for displaying are comprised within a single system.

19. The invention as defined in claim 17 wherein both of said means for displaying are implemented using a single processor running different software for each means.

20. Apparatus for use in processing a view of a three dimensional world in which a first portion of said world is modeled as computer graphics and a second portion of said world is represented by a video on a video surface which exists in said computer graphics portion of said world, wherein said video is made up of a sequence of images, the apparatus comprising:

means for merging the representation of a second object that had been modeled as computer graphics with that of said video surface, so that said second object is represented as part of said video displayed on said video surface as a function of a distance between said object and said video surface; and means for supplying said changed representation to a display for displaying said changed representation to a user.

* * * * *